(12) United States Patent
Daloukas et al.

(10) Patent No.: US 9,959,377 B2
(45) Date of Patent: May 1, 2018

(54) ITERATIVE SOLUTION USING COMPRESSED INDUCTIVE MATRIX FOR EFFICIENT SIMULATION OF VERY-LARGE SCALE CIRCUITS

(71) Applicant: Helic, Inc., San Jose, CA (US)

(72) Inventors: Konstantis Daloukas, Athens (GR); Nestor Evmorfopoulos, Athens (GR)

(73) Assignee: Helic, Inc., San Jose, CA (US)

( * ) Notice: Subject to any disclaimer, the term of this patent is extended or adjusted under 35 U.S.C. 154(b) by 44 days.

(21) Appl. No.: 15/145,611

(22) Filed: May 3, 2016

(65) Prior Publication Data

US 2016/0328508 A1 Nov. 10, 2016

Related U.S. Application Data

(60) Provisional application No. 62/156,767, filed on May 4, 2015.

(51) Int. Cl.
*G06F 17/50* (2006.01)

(52) U.S. Cl.
CPC ...... *G06F 17/5045* (2013.01); *G06F 17/5022* (2013.01); *G06F 2217/62* (2013.01); *G06F 2217/82* (2013.01); *G06F 2217/84* (2013.01)

(58) Field of Classification Search
USPC ......................................................... 716/107
See application file for complete search history.

(56) References Cited

U.S. PATENT DOCUMENTS

| | | | | |
|---|---|---|---|---|
| 2007/0136044 A1* | 6/2007 | Beattie | ............... | G06F 17/5036 703/14 |
| 2011/0029299 A1* | 2/2011 | Zhu | ..................... | G06F 17/5022 703/14 |
| 2016/0378889 A1* | 12/2016 | Moisiadis | ............. | G06F 17/505 716/104 |

OTHER PUBLICATIONS

Börm et al. "Hierarachical Matrices, revised version," Jun. 2006 (173 pages).
Gala et al. "Inductance 101: Analysis and Design Issues," 2001, vol. 22, No. 2 (6 pages).
Chen et al. "Inductwise: Inductance-Wise Interconnect Simulator and Extractor," Jul. 2003, vol. 22, No. 7 (11 pages).
Saad "Iterative Methods for Sparse Linear Systems," 2003, Second Edition (567 pages).
Bebendorf "Hierarchical Matrices," 2008 (303 pages).

* cited by examiner

*Primary Examiner* — Mohammed Alam
(74) *Attorney, Agent, or Firm* — Shami Messinger PLLC

(57) ABSTRACT

Presented herein are systems, methods, and devices for analyzing a circuit. A netlist is obtained and parsed, where the netlist describes the circuit having one or more branches and one or more nodes. A linear system describing the circuit is obtained and compressed using a hierarchical approach. Compression involves storing off-diagonal sub-blocks in a dense matrix in a low-rank format to reduce the density of the matrix. The linear system is then solved using an iterative operation. An initial guess is used for the voltage at each node and the current through each branch. After performing the first iteration, an initial estimate for the voltage and current is stored and used as the initial guess for the second iteration. The iterative operation is continued until the estimate for the voltage at each node and the current through each branch is sufficiently accurate.

14 Claims, 3 Drawing Sheets

Algorithm 1 GMRES Method with preconditioner matrix M
1: $x^{(0)}$ is an initial guess
2: for $j = 1, 2, \ldots$ do
3:    Solve $Mr = b - Ax^{(0)}$
4:    $u^{(1)} = r/\|r\|_2$
5:    $s_1 = \|r\|_2 e_1$
6:    for $i = 1, 2, \ldots, m$ do
7:      Solve $w$ from $Mw = Au^{(i)}$
8:      for $k = 1, \ldots, i$ do
9:        $h_{k,i} = (w, u^k)$
10:       $w = w - h_{k,i} u^{(k)}$
11:      end for
12:      $h_{i+1,i} = \|w\|$
13:      $u^{(i+1)} = w/h_{i+1,i}$
14:      apply $J_1, \ldots, J_{i-1}$ on $(h_{1,i}, \ldots, h_{i+1,i})$
15:      construct $J_i$, acting on $i$th and $(i+1)$st component of $h_{\cdot,i}$, such that $(i+1)$st component of $J_i h_{\cdot,i}$ is 0.
16:      $s_i = J_i s_i$
17:      if $s(i+1)$ is small enough then
18:        UPDATE($\tilde{x}, i$) and quit
19:      end if
20:    end for
21:    UPDATE($\tilde{x}, m$)
22: end for
23: UPDATE($\tilde{x}, i$):
24: Compute $y$ as the solution of $Hy = \tilde{s}$, in which the upper $i \times i$ triangular part of $H$ has $h_{k,j}$ as its elements and $\tilde{s}$ represents the first $i$ components of $s_i$
25: $\tilde{x} = x^{(0)} + y_1 u^{(1)} + y_2 u^{(2)} + \ldots + y_i u^{(i)}$
26: $s_i^{(j+1)} = \|b - A\tilde{x}\|_2$
27: if $\tilde{x}$ is an accurate approximation then
28:    quit
29: else
30:    $x^{(0)} = \tilde{x}$
31: end if

FIG. 1

ITERATIVE SOLUTION USING COMPRESSED INDUCTIVE MATRIX FOR EFFICIENT SIMULATION OF VERY-LARGE SCALE CIRCUITS

STATEMENT OF RELATED APPLICATION(S)

This application claims the benefit of U.S. Provisional Application No. 62/156,767, filed May 4, 2015, which is hereby incorporated by reference herein in its entirety.

TECHNICAL FIELD

The instant disclosure relates generally to software tools for designing and modeling electronic systems, such as printed circuit boards and integrated circuits.

BACKGROUND

A variety of specialized software tools have been developed to meet the challenges of designing and manufacturing more complex and higher performance electronic systems such as printed circuit boards and integrated circuits (ICs). Part of the design process is the simulation of such circuits in order to check the integrity of the circuit design and to predict circuit behavior. For example, it may be desired to simulate an integrated circuit in order to understand the inductive effects of the circuit design. Inductive effects are important in determining power supply integrity, performing timing and noise analysis (especially for global clock networks), and analyzing signal buses and supply grids for high-performance microprocessors. In addition, operation of the circuit at high frequencies introduces coupling effects between components, such as mutual inductance, that must be taken into account during simulation in order to ensure correct results. Moreover, inductive effects have become increasingly impactful as integrated circuit technologies shrink further and low-k dielectrics are used to diminish capacitive effects.

Methods for simulation of large integrated circuits generally focus on the solving linear systems that describe the circuits. These linear systems use matrices to model circuits having a number of nodes and branches. Matrices are used to model node conductances, node capacitances, excitations from independent current sources, self-inductances of each branch, and mutual inductances between branches. The main limiting factor in simulation of such circuits is the inductance matrix, which is a dense matrix—compared to the conductance and capacitance matrices—because mutual inductances between the individual branches is taken into account. As a consequence, the computational and memory requirements of the algorithm used to solve the linear systems are greatly increased.

Certain solutions have been proposed to solve the computation problems presented by the dense linear systems describing the integrated circuits. One approach is to use sparsification techniques to reduce the size of the inductance matrix. The density of a matrix (also known as the sparsity) is the fraction of non-zero elements compared to the total number of elements. Generally, sparse matrices will have a large number of off-diagonal elements equal to zero. As integrated circuits grow large and mutual inductances are taken into account, the inductance matrix grows dense. Sparsification techniques attempt to reduce the size of the inductance matrix to make solving the linear system more efficient. However, sparsification techniques are not based on mathematically established methodologies, and often result in a loss in accuracy. Moreover, sparsification can cause the modified linear system to become unstable. Further approaches attempt to use model-order reduction techniques to simplify the system, such as those demonstrated in Kaushik Gala et al., *Inductance 101: Analysis and Design Issues*, Proceedings of the 38th Annual Design and Automation Conference, ACM 2001. These approaches have also faced difficulties, as many model-order reduction techniques are not effective when applied to circuits with large number of ports, which thus limits their applicability to large-scale circuit simulations.

Finally, many of these approaches combine with a direct method of solving the linear systems. Direct methods are often based on matrix factorization. The computational and memory requirements of these direct methods increase quadratically with the dimensions of the matrices in the linear system. In addition, the factorization step must be performed at every frequency point in the AC analysis, which increases the complexity of the analysis.

There is therefore a need for a new approach for simulating high speed integrated circuits that does not suffer from the drawbacks of prior approaches.

SUMMARY

According to one example, a method for circuit analysis is disclosed. A netlist of a circuit is obtained, where the circuit contains one or more nodes and one or more branches. A linear system describing the circuit is obtained from the netlist. The linear system is then compressed using a hierarchical approach in order to reduce the complexity of the linear system. Finally, the compressed linear system is solved using an iterative operation to obtain a voltage at each of the one or more nodes and a current through each of the one or more branches.

According to another example, compressing the linear system using a hierarchical approach includes compressing an inductance matrix L. A block size is first defined. The inductance matrix L is then partitioned according to the block size to produce a plurality of sub-blocks. Singular value decomposition is performed on sub-blocks located off-diagonal to reduce those off-diagonal sub-blocks to low-rank format. On-diagonal sub-blocks are not reduced to low-rank format.

According to another example, solving the compressed includes performing one or more iterations of the iterative operation. Each iteration of the iterative operation is performed at a respective frequency point. Each iteration of the iterative operation includes supplying an initial guess for the voltage at each of the one or more nodes and the current through each of the one or more branches. Each iteration of the iterative operation also includes updating an overall estimate of the voltage at each of the one or more nodes and a current through each of the one or more branches.

According to another example, the overall estimate of the voltage at each of the one or more nodes and a current through each of the one or more branches is updated during a first iteration. The updated estimate is then used as the initial guess of the voltage at each of the one or more nodes and the current through each of the one or more branches for a second iteration, where the second iteration is immediately subsequent to the first iteration.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIG. 1 is an algorithm showing an exemplary iterative operation for solving a linear system in accordance with certain embodiments described herein.

DETAILED DESCRIPTION

Figure 2:
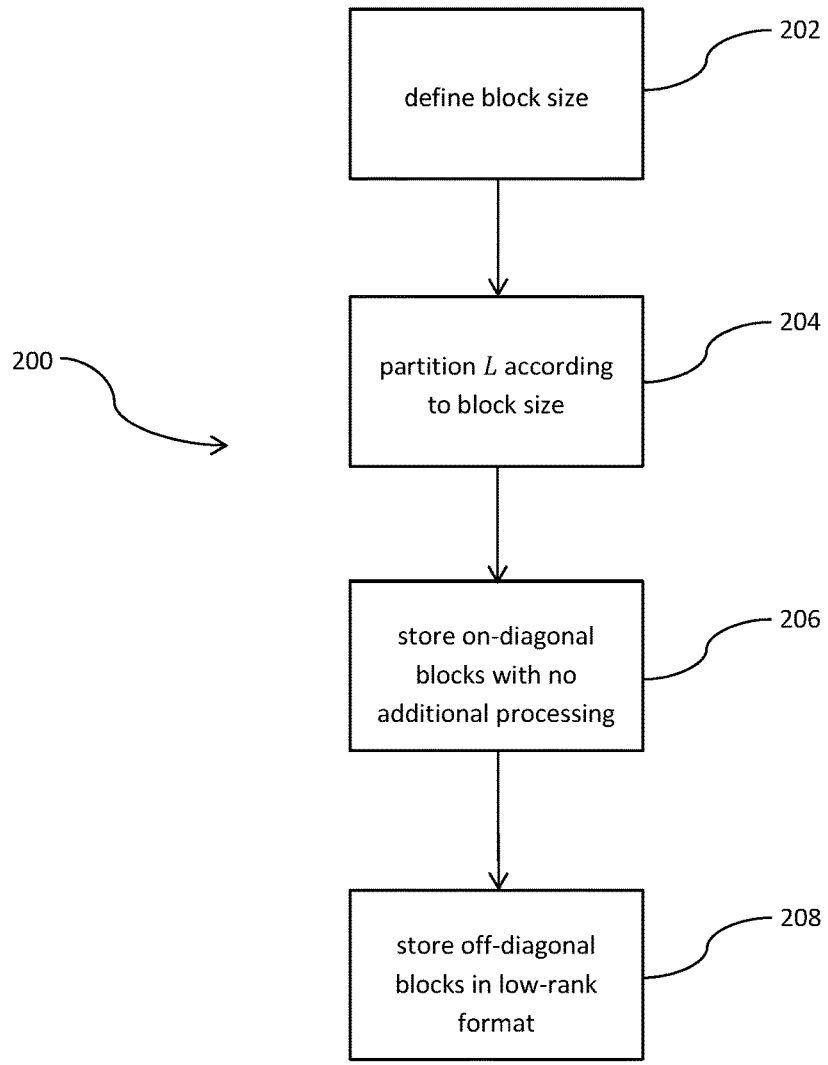
FIG. 2 is a flow diagram showing an exemplary compression method for compressing dense matrices in accordance with certain embodiments described herein.

Embodiments of the present invention are described herein in the context of a system and method for circuit analysis. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Santa Clara, Calif., Microsoft® Windows® XP and Windows® 2000, available from Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like.

Circuit analysis according to the disclosure herein begins by obtaining and parsing a circuit netlist. A netlist is a description of all of the elements in a given circuit and how those elements are connected to each other. Thus, the netlist describes all of the nodes (connections between elements) and branches (the elements themselves) in the circuit. The netlist contains information on the resistance, capacitance, conductance, and inductance of all of the branches, including mutual inductances between branches. Once the netlist is obtained, it is parsed and stored in memory in an appropriate format.

Once the netlist has been parsed, it can be analyzed using a technique known as Modified Nodal Analysis (MNA) (see e.g., Tsung-Hao Chen, Clement Luk, Hyungsuk Kim & Charlie Chung-Ping Chen, *INDUCTWISE: Inductance-Wise Interconnect Simulator and Extractor*, IEEE Transactions on Computer-Aided Design of Integrated Circuits and Systems, 22.7, 884-894 (2006)). Using the MNA approach, the linear system describing the integrated circuit can be obtained. This system is shown below in equation (1):

$$\tilde{G}x + s\tilde{C}x = e \quad (1)$$

where $$\tilde{G} = \begin{bmatrix} G_n & A_{rl}^T \\ -A_{rl} & 0 \end{bmatrix}, \tilde{C} = \begin{bmatrix} C_n & 0 \\ 0 & L \end{bmatrix}, x = \begin{bmatrix} v_n \\ i_b \end{bmatrix}, \text{ and } e = \begin{bmatrix} e_n \\ 0 \end{bmatrix}.$$

In the above system, $A_{rl}$ is an n×b incidence matrix describing the layout of a circuit having n nodes and b branches. The circuit to be analyzed can be expressed through a directional graph. The edges of the graph correspond to the circuit elements, or branches. The nodes of the graph correspond to the nodes of the circuit. The connections between the graph edges and the graph nodes thus denote the interconnection between circuit elements. This directional graph can be described by the incidence matrix $A_{rl}$, where each row corresponds to a graph edge (circuit branch) and each column corresponds to graph node (circuit node). Thus, the individual elements $a_{ij}$ of $A_{rl}$ are equal to ±1 if a branch i is directly connected to a node j, and equal to 0 if the branch is not incident with the node. If the branch is incident with the node, the sign indicates the direction of current flow.

$G_n$ is an n×n matrix of node conductances. This matrix is a square matrix where each term $a_{ij}$ contains information about the conductance between nodes. Where i=j, the matrix element $a_{ij}$ refers to a single node and its value will be the sum of the conductance of each branch that is incident with that node. Where i≠j, the matrix element $a_{ij}$ refers to two distinct nodes and its value will be the sum of the conductance of every branch that is connected to both nodes. Similarly, $C_n$ is an n×n matrix of node capacitances that is constructed the same as $G_n$.

The matrix L is a b×b matrix describing the self and mutual inductances of the circuit. Where i=j, the matrix element $a_{ij}$ refers to the self-inductance of a single branch. Where i≠j the matrix element $a_{ij}$ refers to the mutual inductance between the two branches. Because of the mutual inductances between branches, inductance matrix L is generally a dense matrix. $v_n$ is an n×1 vector of node voltages, $i_b$ is a b×1 vector of branch currents, and $e_n$ is an n×1 vector of excitations from independent current sources at the nodes. Finally, s=iω and refers to the frequency point at which the circuit is being analyzed, where $i^2$=−1 and ω equals the angular frequency.

To simplify the system, a system matrix A can be defined such that A=G̃+sC̃, so that the circuit to be analyzed can be described by equation (2):

$$Ax=e \quad (2)$$

Thus, application of MNA to the netlist results in a linear system to be solved. Here, system matrix A is a non-symmetric matrix with a very large number of unknowns. Because A encapsulates the inductance matrix L, the conductance matrix $G_n$, and the capacitance matrix $C_n$, A is considered to be a dense matrix. Again, matrix e is a single column matrix containing the excitations from independent current sources, while matrix x is a single column matrix containing the node voltages and branch currents. Matrix x is unknown, and thus analyzing the circuit involves solving for the node voltages and branch currents.

Once equation (2) has been obtained, this equation can be solved to analyze the circuit. In order to solve this equation, an iterative method is used. For example, a Generalized Minimal Residual Method (GMRES) that belongs in the broad category of non-stationary Krylov-subspace methods may be used (see, e.g., Yousef Saad, *Iterative Methods for Sparse Linear Systems*, Siam 2003). The algorithm for the GMRES method is shown in FIG. 1. This algorithm essentially solves a least squares problem by utilizing the Krylov subspaces of the system matrix A. As shown, the GMRES method implements an Arnoldi algorithm with a Givens rotation algorithm, and then approximates the current.

As the GMRES method is an iterative solution, an initial solution for x is used at a first frequency point. Matrix M is a preconditioner matrix that is used to reduce the number of iterations the algorithm must run through. Matrix M is based on the system matrix A, and may be created using any suitable precondition algorithm, such as an ILU preconditioning algorithm. The preconditioning matrix M thus encapsulates a large degree of information about the circuit to be analyzed, which allows the iterative method to quickly converge to the actual solution for x. Vectors u, r, s, w, and h are temporary vectors, $J_i$ is the Givens rotation matrix, and H is the orthonormal basis that is calculated from the Arnoldi algorithm. Each iteration of the GMRES algorithm corresponds to a frequency point. As stated, during the first iteration of the iterative operation, an initial guess for x is used. After running the first iteration, the current is approximated and then used as the initial guess for the next iteration. After iterating through all frequency points, the matrix x describing the node voltages and the branch currents is obtained.

Using an iterative solution such as the GMRES method has a number of benefits. The primary advantage is that such a solution involves only inner products (i.e. dot products) and matrix-vector products. Moreover, only a small number of vectors must be stored in memory of the computing system or processing circuitry that is being utilized at any one time, thus reducing the computational and memory requirements needed. Furthermore, the GMRES method is robust and does results in few errors, such as round-off error or truncation error. Thus, iterative solutions are capable of handling linear systems describing circuits containing millions of circuit elements (branches) and having a large number of nodes.

However, while iterative methods such as the GMRES method provide certain advantages over direct methods, they can still suffer from a certain amount of complexity. For example, as shown in FIG. 1, the GMRES method involves matrix-vector multiplication at both steps 3 and steps 7:

Solve $Mr=b−Ax$ (Step 3)

Solve w from $Mw=Au$ (Step 7)

The complexity of these steps is on the order of $O(n^2)$ if the matrices involves are dense matrices. As described earlier, system matrix A is a dense matrix describing the inductive, conductive, and capacitive relationships between the circuits nodes and branches, and thus contains a large number of non-zero values populating the off-diagonal elements. Thus, utilizing an iterative method such as the GMRES method with system matrix A, while providing some advantages, still results in a slower computation time when analyzing complex integrated circuits.

To overcome the disadvantages of iterative solutions such as the GMRES method, the dense matrices that compose the system matrix A may be stored using a hierarchical approach (see, e.g., Mario Bebendorf, *Hierarchical Matrices*, Springer Berlin Heidelberg 2008). This approach involves storing certain portions of dense matrices in a low-rank format, which results in a very efficient storage scheme for matrices such as the inductance matrix L. As shown in FIG. 2, compressing matrices into hierarchical form involves a number of steps. At step 202, a block size is defined. At step 204, a dense matrix such as L is partitioned according to the block size defined in step 202. At step 206, blocks closer to the diagonal of the matrix are stored without any additional processing. These blocks contain matrix elements with significant non-zero values, and thus are stored in what is known as full-rank format. At step 208, blocks that are further away from the diagonal are processed so that they can be saved in a low-rank format. These blocks contain matrix elements that are located further away from the diagonal of the matrix, and whose values are much closer to zero than the matrix elements in blocks stored in full-rank format. As is shown in step 208, these blocks suitable for low-rank format are processed and stored using a Singular Value Decomposition (SVD) analysis to keep only the most significant singular vectors and singular values. These low-rank format blocks require less memory to store the individual elements. Thus, using SVD on the off-diagonal blocks results in a compressed matrix that is much easier to store and results in more efficient computation than the original dense matrix. The compression processes therefore reduces a complexity of the dense matrix L, and thus reduces the complexity of the overall linear system.

Inductance matrix L is particularly well-suited to compression using a hierarchical approach because many of the individual elements $l_{ij}$ decrease in value with increasing distance from the main diagonal. This is due to the fact that the inductance matrix is formed with consecutive rows or columns representing branches that are located in close proximity with one another in the physical circuit layout. Thus, elements of the matrix L that are located further away from the diagonal represent branches that are located physically apart from each other. Thus, the value of the elements $l_{ij}$—representing the mutual inductance between branches i and j—decreases towards zero as the elements tend away from the diagonal of L. Using the hierarchical approach described above to compress the inductance matrix L results in a computational complexity that is on the order of O(n $\log_\alpha$ n) for some small constant $\alpha$. Once the hierarchical approach described above and shown in FIG. 2 has been applied to at least the inductance matrix L, it can be combined with the iterative method described with respect to FIG. 1.

Figure 3:
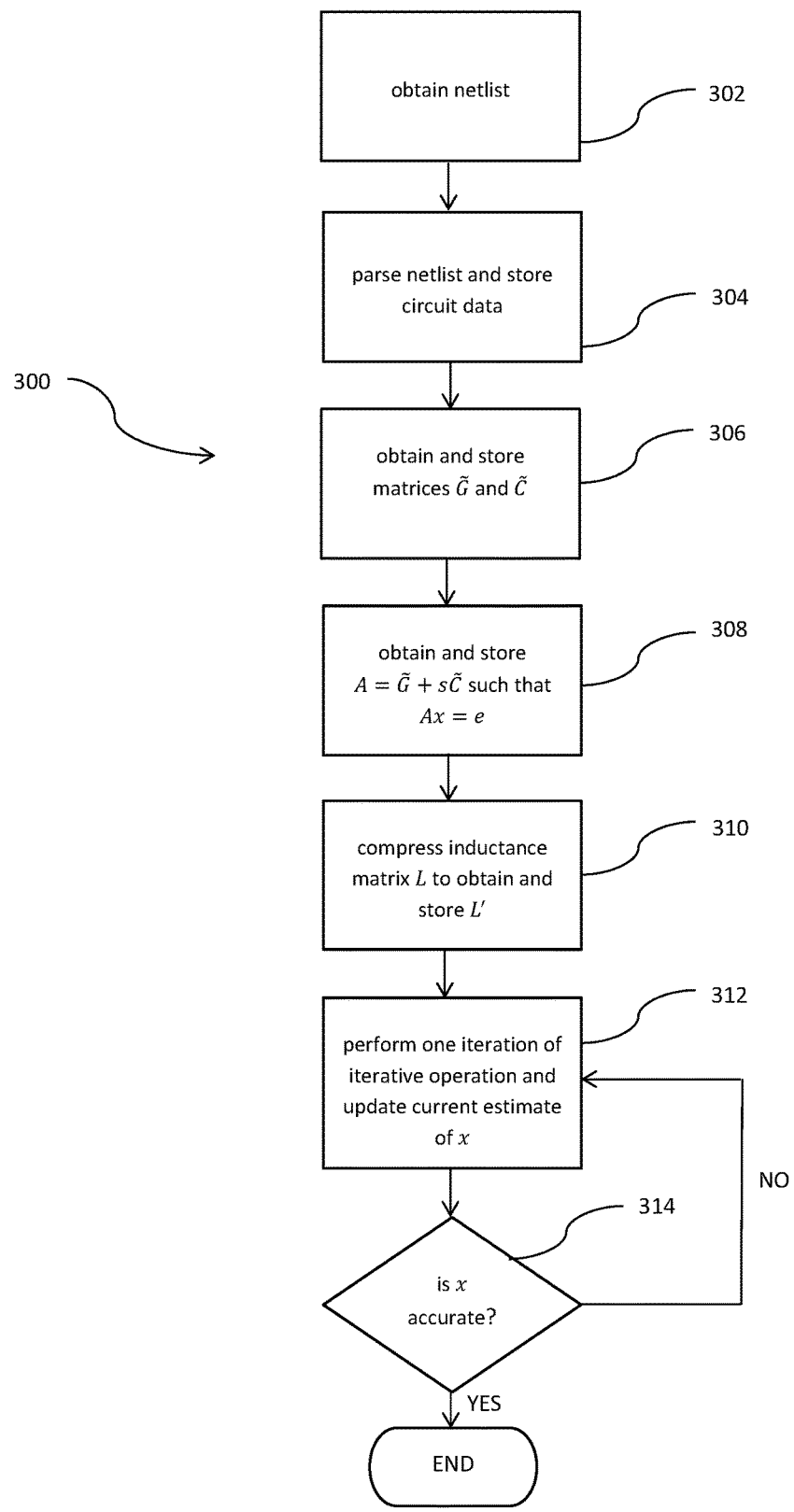
FIG. 3 is a flow diagram showing an exemplary method for simulating a circuit in accordance with certain embodiments described herein.

FIG. 3 is a flow diagram of a circuit analysis method 300 in accordance with certain embodiments. This method may be run on any suitable computing system or processing circuitry.

At step 302, a netlist describing the circuit to be analyzed is obtained. As described herein, a netlist contains all of the information about the individual circuit elements (branches), including conductance, capacitance, inductance, etc. The netlist also describes how the individual branches are connected to the individual nodes of the circuit. At step 304, the netlist is parsed so that all of the information in the netlist is stored in memory of the computing system or the processing circuitry that is performing the analysis.

At step 306, modified nodal analysis is performed to obtain and store matrix $\tilde{G}$, which contains sub-matrices $A_{rl}$ (incident matrix) and $G_n$ (conductance matrix). Furthermore, matrix $\tilde{C}$, which contains sub-matrices $C_n$ (capacitance matrix) and L (inductance matrix) is obtained and stored. Finally, the modified nodal analysis produces matrix e containing the excitations of the independent current sources at each node, and matrix x, which contains the unknown values of the node voltages and the branch currents.

At step 308, the system matrix $A=\tilde{G}+s\tilde{C}$ is obtained and stored, such that the linear system representing the circuit to be analyzed may be shown as Ax=e. At step 310, the linear system is compressed by compressing the inductance matrix L that is stored in system matrix A. Inductance matrix L is compressed by storing certain portions of L in a low-rank format. The resulting compressed matrix, denoted as L', retains the most significant information regarding the self and mutual inductances of the circuit, but occupies much less space in the computing system being used to perform the analysis. While step 310 shows the inductance matrix L being compressed, any dense matrix encapsulated within the system matrix A may similarly be compressed, in addition or instead of inductance matrix L.

At step 312, a single iteration of an iterative operation is performed on the compressed linear system. In one embodiment, the iterative solution that is used may be the GMRES method, as described herein. Using the GMRES method, the first iteration at an initial frequency point makes an initial guess for solution to matrix x containing the node voltages and the branch currents. Once the iteration is complete, the current estimate for x is updated. At step 314, it is determined whether the current estimate of x is sufficiently accurate. If the current estimate is satisfactory, the process ends, with x representing the node voltages and the branch currents. If the current estimate of x is not satisfactory, the method returns to step 312 where the next iteration takes place. The next iteration is performed at the next frequency point, using the current estimate of x as the initial guess for x.

The resulting method for analyzing large-scale integrated circuits as described herein requires much less computational power and memory capacity. Compressing the linear system by compressing at least the inductance matrix L, combined with an iterative operation such as the GMRES algorithm results in a much more efficient method of simulating large-scale integrated circuits than with prior methods. Compression techniques, such as those demonstrated with the hierarchical approach, allow dense matrices such as L to be stored using a much smaller amount of memory. This accordingly allows the method disclosed herein to analyze larger circuits than prior techniques were capable of. Further, the compressed matrix retains a large portion of the information contained in the full matrix, and thus does not suffer from a lack of accuracy like prior sparsification techniques have. Finally, iterative operations are much less complex than direct operations, and thus require much less computational power and time to reach a solution.

The method illustrated in FIG. 3 also greatly increases the amount of parallelism available. For example, as shown by equations (1) and (2), system matrix A is composed of sub-matrices $\tilde{G}$ and $\tilde{C}$, which themselves are composed of sub-matrices $G_n$, $C_n$, $A_{rl}$, and L. Thus, in solving for the node voltages and branch currents in matrix x, multiple computational threads (i.e. multiple processing units or processing cores within processing units) can work in parallel on the different matrix-vector multiplications. Moreover, the individual matrix-vector multiplications can be further subdivided into multiple vector-vector multiplications. Finally, because inductance matrix L is partitioned into blocks during the compression step, multiple processing threads are able to work in parallel on different blocks of L. Thus, the method illustrated in FIG. 3 allows a computing system or processing circuitry performing the analysis of the integrated circuit to complete the analysis much quicker than other techniques.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A circuit analysis method for use in the design of an integrated circuit, the circuit analysis method comprising:
obtaining a netlist of a circuit, the circuit containing one or more nodes and one or more branches;
generating from the netlist a linear system describing the circuit, the linear system comprising a mathematical representation of the circuit that is defined as $\tilde{G}x+s\tilde{C}x=e$, where $$\tilde{G} = \begin{bmatrix} G_n & A_{rl}^T \\ -A_{rl} & 0 \end{bmatrix}, \tilde{C} = \begin{bmatrix} C_n & 0 \\ 0 & L \end{bmatrix},$$

$G_n$ is a matrix of node conductances, $C_n$ is a matrix of node capacitances, $A_{rl}$ is the incidence matrix describing the circuit, L is a matrix of self and mutual branch inductances, x is a matrix of node voltages and branch currents, and e is a matrix of independent current source excitations;
compressing the linear system using a hierarchical approach to reduce a complexity of the linear system;
using an iterative operation, solving the compressed linear system to obtain a voltage at each of the one or more nodes and a current through each of the one or more branches, said obtained voltages and currents being usable in said design of the integrated circuit.

2. The circuit analysis method of claim 1, wherein generating the linear system includes performing modified nodal analysis on the netlist of the circuit.

3. The circuit analysis method of claim 1, wherein the linear system is compressed by compressing the inductance matrix L using the hierarchical approach.

4. The circuit analysis method of claim 3, wherein compressing the inductance matrix L includes:
defining a block size;
partitioning inductance matrix L according to the block size to produce a plurality of sub-blocks;
performing singular value decomposition on one or more off-diagonal sub-blocks to reduce the one or more off-diagonal sub-bocks to low-rank form;
storing the off-diagonal sub-blocks that have been reduced to low-rank form;
storing one or more on-diagonal sub-blocks that have not been reduced to low-rank form.

5. The circuit analysis method of claim 1, wherein the iterative operation includes applying a preconditioner matrix M to the linear system.

6. The circuit analysis method of claim 1, wherein solving the compressed linear system includes performing one or more iterations of the iterative operation, each of the one or more iterations being performed at a respective one of a plurality of frequency points, and wherein each iteration includes (i) supplying an initial guess for the voltage at each of the one or more nodes and the current through each of the one or more branches, and (ii) updating an overall estimate for the voltage at each of the one or more nodes and the current through each of the one or more branches.

7. The circuit analysis method of claim 6, wherein the overall estimate that is updated during a first iteration is used as the initial guess for a second iteration immediately subsequent to the first iteration, the first iteration and the second iteration being performed at different ones of the plurality of frequency points.

8. A non-transitory program storage device readable by a machine, embodying a program of instructions executable by the machine to perform a circuit analysis method for use in the design of an integrated circuit, the circuit analysis method comprising:
obtaining a netlist of a circuit, the circuit containing one or more nodes and one or more branches;
generating from the netlist a linear system describing the circuit, the linear system comprising a mathematical representation of the circuit that is defined as $\tilde{G}x+s\tilde{C}x=e$, where $$\tilde{G} = \begin{bmatrix} G_n & A_{rl}^T \\ -A_{rl} & 0 \end{bmatrix}, \tilde{C} = \begin{bmatrix} C_n & 0 \\ 0 & L \end{bmatrix},$$

$G_n$ is a matrix of node conductances, $C_n$ is a matrix of node capacitances, $A_{rl}$ is the incidence matrix describing the circuit, L is a matrix of self and mutual branch inductances, x is a matrix of node voltages and branch currents, and e is a matrix of independent current source excitations;
compressing the linear system using a hierarchical approach to reduce a complexity of the linear system;
using an iterative operation, solving the compressed linear system to obtain a voltage at each of the one or more nodes and a current through each of the one or more branches, said obtained voltages and currents being usable in said design of the integrated circuit.

9. The device of claim 8, wherein generating the linear system includes performing modified nodal analysis on the netlist of the circuit.

10. The device of claim 8, wherein the linear system is compressed by compressing the inductance matrix L using the hierarchical approach.

11. The device of claim 10, wherein compressing the inductance matrix L includes:
defining a block size;
partitioning inductance matrix L according to the block size to produce a plurality of sub-blocks;
performing singular value decomposition on one or more off-diagonal sub-blocks to reduce the one or more off-diagonal sub-bocks to low-rank form;
storing the off-diagonal sub-blocks that have been reduced to low-rank form;
storing one or more on-diagonal sub-blocks that have not been reduced to low-rank form.

12. The device of claim 8, wherein the iterative operation includes applying a preconditioner matrix M to the linear system.

13. The device of claim 8, wherein solving the compressed linear system includes performing one or more iterations of the iterative operation, each of the one or more iterations being performed at a respective one of a plurality of frequency points, and wherein each iteration includes (i) supplying an initial guess for the voltage at each of the one or more nodes and the current through each of the one or more branches, and (ii) updating an overall estimate for the voltage at each of the one or more nodes and the current through each of the one or more branches.

14. The device of claim 13, wherein the overall estimate that is updated during a first iteration is used as the initial guess for a second iteration immediately subsequent to the first iteration, the first iteration and the second iteration being performed at different ones of the plurality of frequency points.

* * * * *